United States Patent
Matula et al.

(10) Patent No.: US 8,429,432 B2
(45) Date of Patent: Apr. 23, 2013

(54) STAND-BY POWER SYSTEM FOR INFORMATION HANDLING SYSTEMS

(75) Inventors: Terry Matula, Austin, TX (US);
Vaibhav P. Sapre, Austin, TX (US);
Stephen Seitsinger, Austin, TX (US);
John Stuewe, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 492 days.

(21) Appl. No.: 12/603,993

(22) Filed: Oct. 22, 2009

(65) Prior Publication Data
US 2011/0099389 A1    Apr. 28, 2011

(51) Int. Cl.
*G06F 1/26* (2006.01)

(52) U.S. Cl.
USPC ........... 713/300; 713/310; 713/320; 713/321; 713/322; 713/323; 713/324; 713/330; 713/340

(58) Field of Classification Search ............. 713/300, 713/310, 320–324, 330, 340
See application file for complete search history.

(56) References Cited

U.S. PATENT DOCUMENTS

| | | | | |
|---|---|---|---|---|
| 3,631,257 A | * | 12/1971 | Behr et al. ................. | 307/66 |
| 5,786,641 A | * | 7/1998 | Nakanishi et al. ............ | 307/64 |
| 6,256,744 B1 | * | 7/2001 | Simonich et al. ............. | 713/340 |
| 7,353,415 B2 | * | 4/2008 | Zaretsky et al. ............. | 713/320 |
| 7,478,254 B2 | * | 1/2009 | Kawai ........................ | 713/323 |
| 7,685,443 B2 | * | 3/2010 | Chheda et al. .............. | 713/320 |
| 8,015,419 B2 | * | 9/2011 | Rowhani et al. ............. | 713/300 |
| 2005/0081074 A1 | * | 4/2005 | Chheda et al. .............. | 713/320 |
| 2006/0230299 A1 | * | 10/2006 | Zaretsky et al. ............. | 713/320 |
| 2008/0168288 A1 | * | 7/2008 | Jia et al. ...................... | 713/323 |

OTHER PUBLICATIONS

HP Z Workstation series—EUP compliance mode—c01757764—HP Business Support Center; HP Z Workstation series—EUP complaince Mode; 2009; pp. 1-2; Hewlett-Packard Development Company, L.P.; http://h20000.www2.hp.com/bizsupport/TechSupport/Document.jsp?lang=en&cc=us&objectID=c01757764&prodTypeID=12454&prodSeriesId=3718645.

* cited by examiner

*Primary Examiner* — M Elamin
(74) *Attorney, Agent, or Firm* — Haynes and Boone, LLP

(57) ABSTRACT

A power supply system includes a power supply coupled to a load via a main power rail, and a switch coupled between the power supply and the load on an auxiliary power rail. A controller controls the switch to couple the auxiliary power rail to the load in response to a startup command, and the controller controls the switch to uncouple the load from the auxiliary power rail in response to a shut down command and a low power mode being enabled.

20 Claims, 4 Drawing Sheets

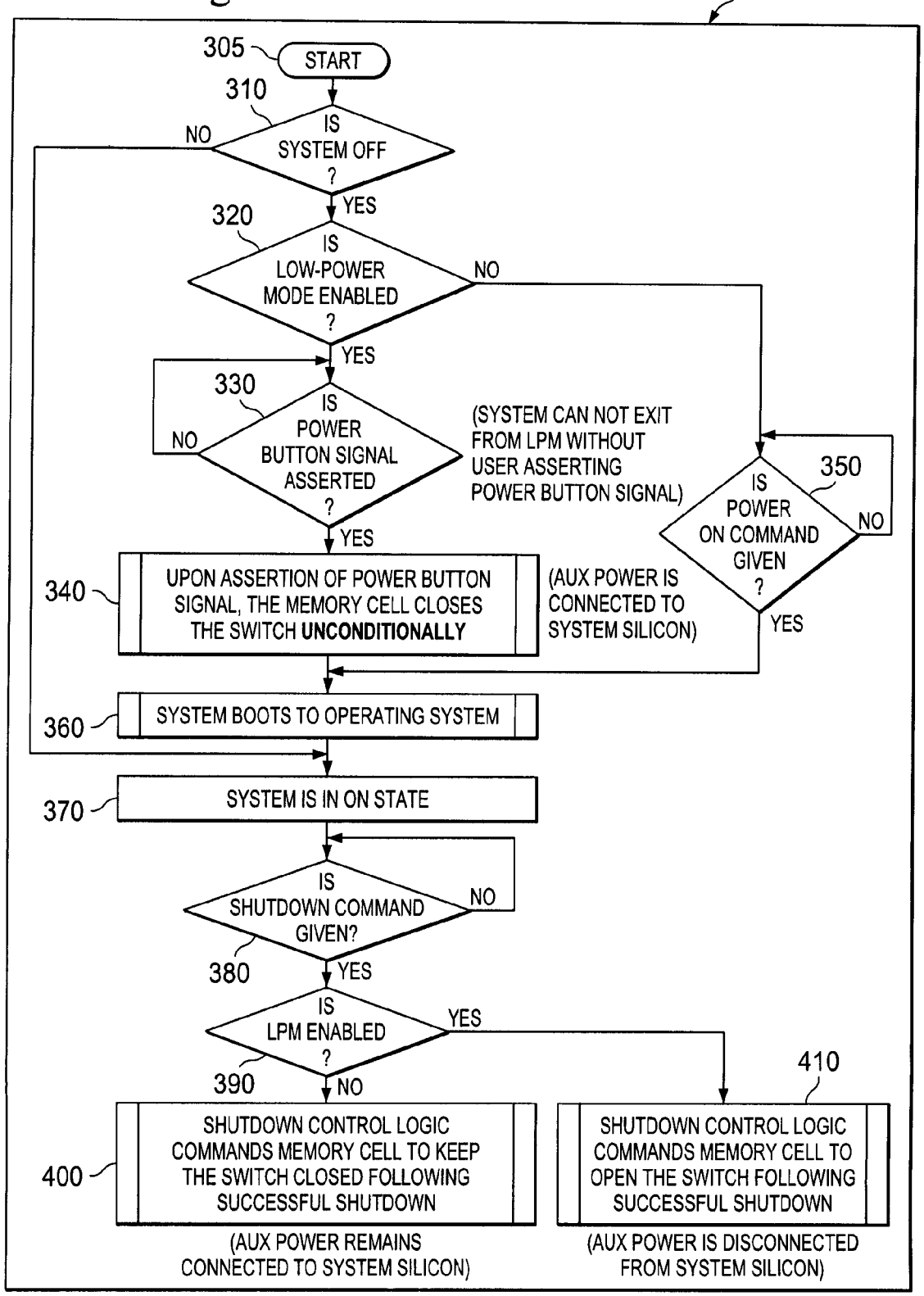

STAND-BY POWER SYSTEM FOR INFORMATION HANDLING SYSTEMS

BACKGROUND

The present disclosure relates generally to information handling systems (IHSs), and more particularly to a stand-by power system for IHSs.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs generally have a power supply that supplies low voltage power (e.g., 3.3 v) known as auxiliary power (AUX) when the IHS is "plugged-in" to a line voltage or other power supply. This auxiliary power is traditionally supplied to the IHS even when the IHS is powered down/off.

Recent and projected increases in the cost of energy and the movement toward environmentally friendlier products are causing computer customers to demand computing products that consume less power. For example, the European Union's Energy-Using-Products (EuP) directive will require appliances sold in the EU in 2013 to consume less than 0.5 W (wall power) when in the OFF state. In other words, with respect to energy consciousness, IHS consumers and government regulators are lowering requirements on how much power an IHS can consume in the off/powered-down state. See for example, Federal Energy Management Programs (FEMP) and the European Union Energy Using Products (EU EuP) bulletin 080214-01. As a result, IHS developers and manufacturers are looking for systems to reduce the off state power of their products.

Accordingly, it would be desirable to provide an improved stand-by power system for IHSs.

SUMMARY

According to one embodiment, a stand-by power supply system includes a power supply coupled to a load via a main power rail and a switch coupled between the power supply and the load on an auxiliary power rail. A controller controls the switch to couple the power supply to the load in response to a startup command, and the controller controls the switch to uncouple the load from the power supply in response to a shut down command and a low power mode being enabled.

BRIEF DESCRIPTION OF THE DRAWINGS

FIG. 4 illustrates a flow chart of an embodiment of method for operating the power on/off system of FIG. 2.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
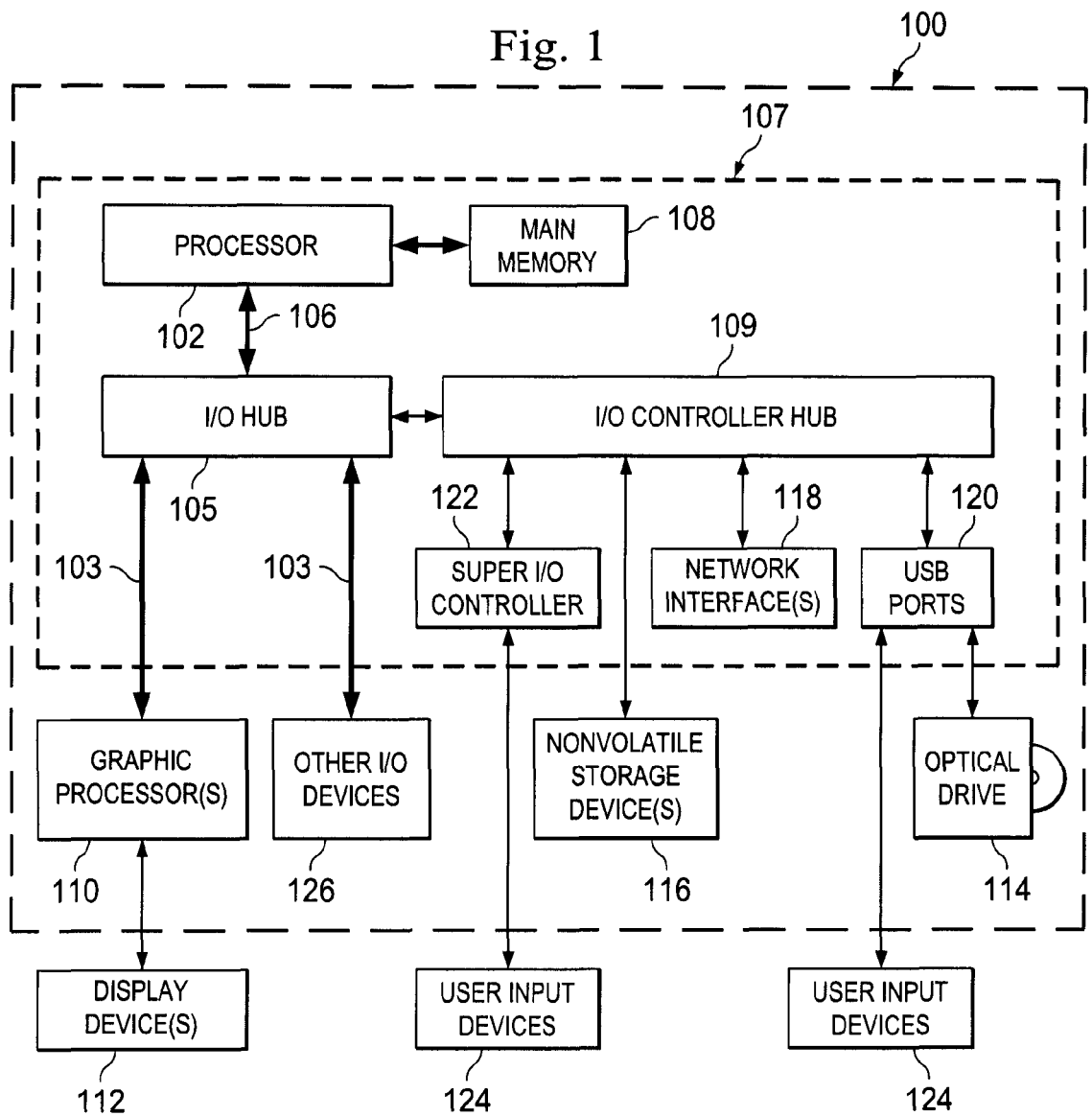
FIG. 1 illustrates a block diagram of an embodiment of an information handling system (IHS).

FIG. 1 is a block diagram of one IHS 100. The IHS 100 includes a processor 102 such as an Intel Pentium™ series processor or any other processor available. The processor 102 is coupled to a main board/motherboard 107. An I/O hub 105 (comprising one or more integrated circuits) connects to processor 102 over a communications bus 106 such as an Intel QuickPath Interconnect (QPI)™. I/O hub 105 provides the processor 102 with access to a variety of resources. Main memory 108 (e.g., a plurality of dual in-line memory modules (DIMMs) connects to processor 102 over a memory or data bus. A graphics processor 110 and other I/O devices may connect to I/O hub 105 over a communication bus 103 such as the Intel Peripheral Component Interface Express (PCIe) bus, allowing the graphics processor 110 and other I/O devices 126 to communicate, e.g., with processor 102 and main memory 108. Graphics processor 110, in turn, provides display signals to a display device 112.

An I/O controller hub 109 is communicatively coupled to the I/O hub 105. Other resources can also be coupled to the system through the I/O controller hub 109 using a data bus, including an optical drive 114 or other removable-media drive, one or more non-volatile storage devices 116 such as a hard disk drive, a solid-state drive, etc., one or more network interfaces 118, one or more Universal Serial Bus (USB) ports 120, and a super I/O controller 122 (e.g., embedded or connected via a PCIe interface) to provide access to user input devices 124, (e.g. a mouse, keyboard, printer, flash drive, etc.). The non-volatile storage device(s) 116 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the I/O hub 105 can be combined together. As can be appreciated, many systems are expandable, and include or can include a variety of components, including redundant or parallel resources.

In response to recent and projected increases in the cost of energy and the movement toward environmentally friendlier products, IHS manufacturers are designing IHSs that consume less electrical power. As an example, IHSs are being designed to consume less power (e.g., standby power) in the off/powered-down state. In an IHS, there are generally two devices that consume standby power. One is the power supply unit (PSU) and the other is the motherboard. In one example, a Dell T7500 workstation may traditionally have a PSU that consumes ~400 mW and a motherboard that consumes ~400 mW in the Advanced Configuration and Power Interface (ACPI) soft off/S5 state. However, using embodiments of the present disclosure, the workstation IHS may reduce the standby power required by the motherboard by more than a factor of 10 (e.g., the motherboard power may be reduced to ~5 mW). Accordingly, the present disclosure provides for satisfying upcoming off-state power requirements without making costly changes to the IHS PSU.

The present disclosure provides a system where the standby power rail is switched on and off based on a user-configured option (e.g., low power mode enabled/disabled) in a basic input/output system (BIOS) setup or as an operating system setting. However, it should be understood that other systems, such as jumpers, external drivers, etc., may be used to indicate a low power mode enabled for switching off the standby power rail.

In an embodiment, the present disclosure includes an IHS having a control block coupled to a memory cell and a switch for switching the auxiliary power rail. The control block and memory may be separate devices coupled together or integrated into a single device. A switch control signal is an output of the control block and an input to the switch. The switch control signal commands the switch to either turn on or off based on inputs to the control block. Inputs to the control block and memory include a low-power mode (LPM) enable signal, various power state control (PSC) signals, and a power-on signal. The IHS system silicon/chipset is the source for the LPM enable signal and one or more PSC signals. The IHS power button is one possible source for the power-on signal, however other sources are contemplated.

When the system is commanded to turn on, e.g. the power button is pressed, the power-on signal initiates the turn-on process by commanding the control block to turn on the standby power rail and then the system turns on other components of the IHS. A user of the IHS may enable a low power mode using the BIOS setup screen, the IHS operating system or through some other setting system or physical device, such as a jumper setting. The LPM enable signal is set to the appropriate logic level via control software and the IHS silicon/chipset, e.g. logic low is LPM disabled and logic high is LPM enabled. When the system is commanded to shutdown, the PSC signals are monitored to determine when the auxiliary/standby power rail can be safely switched off. Then the system will shutdown, leaving the power supply coupled to the system silicon via the auxiliary power rail. Next, the control block will command the switch to turn off the auxiliary power rail when it is safe to do so (e.g., usually after the main power rails have been turned off).

Figure 2:
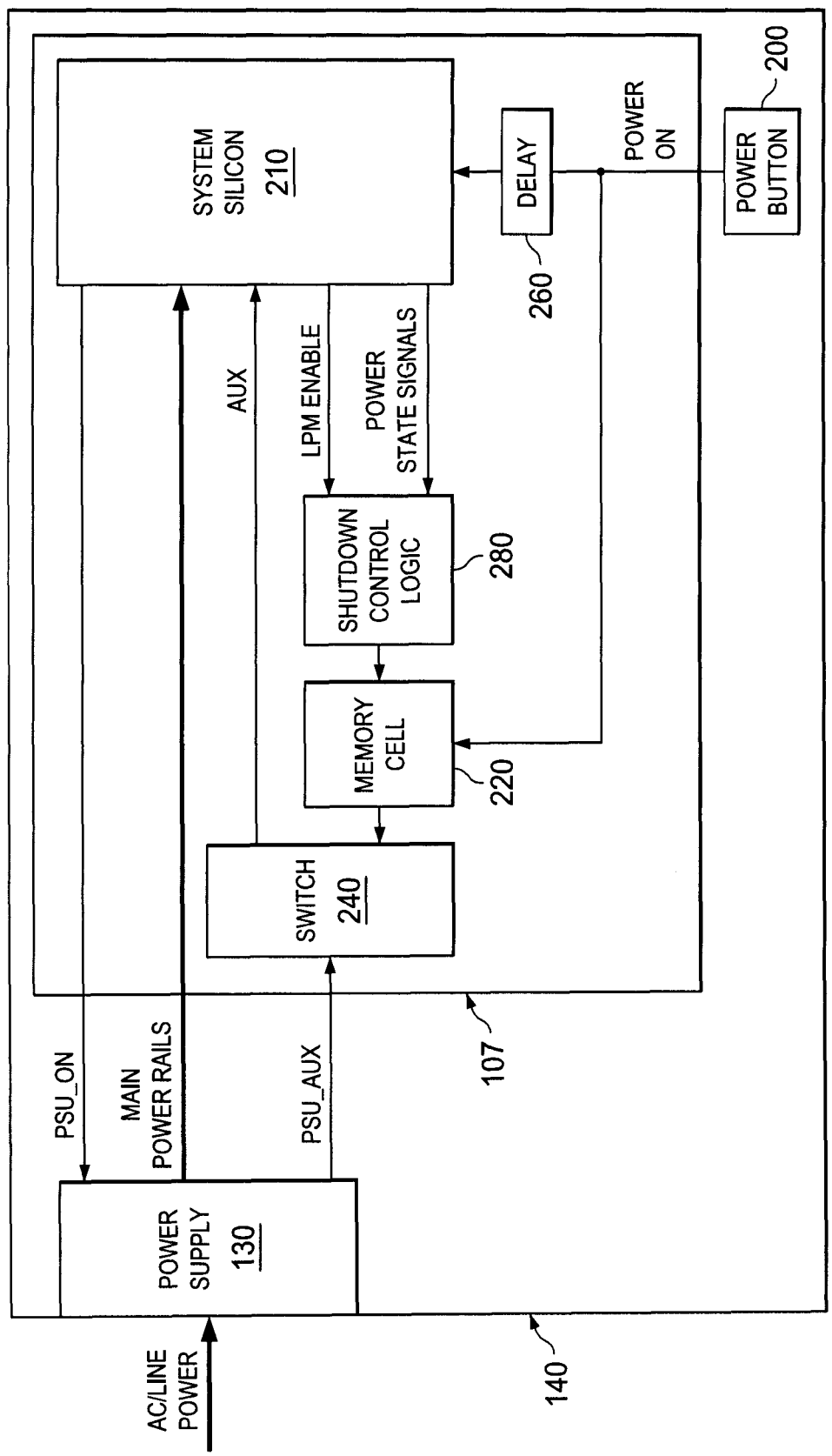
FIG. 2 illustrates a block diagram of a power on/off system for the IHS of FIG. 1.
Figure 3:
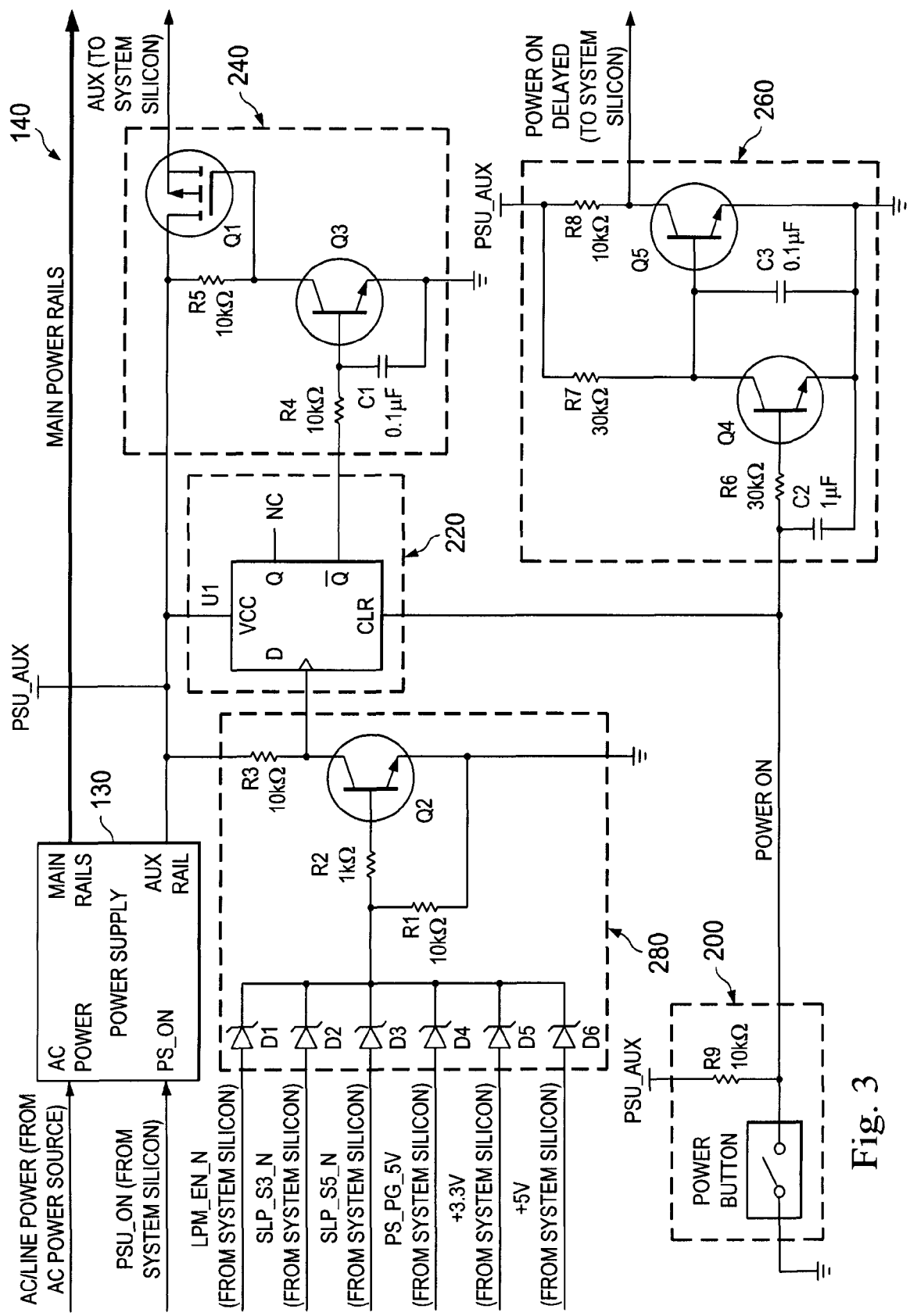
FIG. 3 illustrates a schematic diagram for an embodiment of the power on/off system of FIGS. 2 and 4.

FIG. 2 illustrates a block diagram of a power on/off system 140 for the IHS 100. FIG. 3 illustrates a schematic diagram for an embodiment of the power on/off system 140. An electrical line voltage power is provided to a power supply 130. The power supply 130 in turn converts the line voltage to an electrical power that is usable by the on/off system 140 of the IHS 100. For example, the power supply 130 may convert 120-240 vac to 19.5 vdc. However, other voltages may be used with the present disclosure. The power supply 130 is coupled to the system silicon 210 on the motherboard 107 via one or more main power rails. The system silicon includes a variety of the IHS components such as the processor 102, the I/O hub 105, the I/O controller hub 109, the super I/O controller 122 and/or a variety of other components. The system silicon 210 communicates with the power supply 130 via a PSU_ON signal to indicate to the power supply 130 that it is to be in an on state.

The power supply 130 is also coupled to the system silicon 210 via an auxiliary/stand by power rail (PSU_AUX). The auxiliary power rail is switchably controlled by a switch 240. The switch 240 is an electronic transistor/P-channel field-effect transistor (FET) switch, as shown in FIG. 3. However, other switching devices, such as N-channel FETs or relays may be used. Controlling the operation of the switch 240 is a logic controller 280 coupled to a memory device 220. The memory device 220 is D-type flip-flop coupled to the control logic 280, the auxiliary power rail at VCC, the switch 240 at (/Q) and a power button switch 200 at CLR, as shown in FIG. 3. The power button system 200 uses a momentary push button for coupling the memory device 220 to electrical ground when the button is pressed. However, in another embodiment, it is contemplated that other types of turn-on signals may be used. The control logic 280 provides a switch control signal to the memory device 240. The control switch signal is generated using the low power mode enabled signal (LPM_EN_N), ACPI sleep state S3 signal (SLP_S3_N), ACPI sleep state S5 signal (SLP_S5_N), power supply power good signal (PS_PG_5V), +3.3V and +5V via respective diodes D1-D6, as shown in FIG. 3. Other types of control signals could be used to indicate when it is safe to disconnect the AUX power rail from the system silicon. It is also contemplated that various other transistors, resistors, capacitors, diodes and/or other electrical/electronic devices are also used for the on/off system 140.

FIG. 4 illustrates a flow chart of an embodiment of method 300 for operating the power on/off system 140 of the IHS 100. The method 300 begins at block 305. The method 300 proceeds to decision block 310 where the method 300 determines whether the IHS 100 is in an off mode. If no, the method 300 determines that the system is not off, the method proceeds to block 370, which will be described in more detail below. On the other hand, if yes, the IHS 100 is in an off mode, the method 300 proceeds to decision block 320 where the method 300 determines whether a low-power mode is enabled. If no, the method 300 determines that the low power mode is not enabled, the method 300 proceeds to decision block 350, which will be described in more detail below. On the other hand, if yes, the method 300 determines that the low power mode is enabled, the method 300 proceeds to decision block 330 where the method 300 determines whether a power button signal is asserted. If no, the method 300 determines that the power button signal is not being asserted, the method 300 loops back to decision block 330. On the other hand, if yes, the method 300 determines that the power button signal is being asserted, the method 300 proceeds to block 340 where, upon assertion of the power button signal, the method 300 causes the memory device 220 to close the switch 240 unconditionally so that the auxiliary power rail is connected to the system silicon 210. The method 300 then proceeds to block 360, which will be described in more detail below.

Returning now to decision block 320, if no, the method 300 determines that the low power mode is not enabled, the method 300 proceeds to decision block 350 where the method 300 determines whether a power on command is given to the IHS 100. If no, a power on command is not given, the method 300 loops back to decision block 350. On the other hand, if yes, the method 300 determines that a power on command is given, the method 300 proceeds to block 360 where the IHS 100 boots to an operating system. The method 300 then proceeds to block 370, described below. In other words, if the system is not in a low power mode, the switch 240 is always closed and the auxiliary power rail is always connected to the system silicon 210. The system can power on by any means, such as the power button 200, a remote wake up command and etc.

Now returning to decision block 310, if no, the method 300 determines that the system is not off, the method 300 proceeds to block 370. In block 370 the method 300 continues with the IHS 100 operating in the on state. The method 300 then proceeds to decision block 380 where the method 300 determines whether a shutdown command is given. If no, the method 300 determines that a shutdown command is not given, the method returns to block 380. On the other hand, if yes, the method 300 does determine that a shutdown command is give, the method 300 proceeds to decision block 390 where the method 300 determines whether the low power mode is enabled. If no, the method 300 determines that the low power mode is not enabled, the method 300 proceeds to block 400 where the shutdown control logic 280 commands the memory device 220 keep the switch 240 closed following a successful shutdown of the IHS 100. In other words, the auxiliary power rail remains connected to the system silicon 210. In decision block 390, if yes, the method 300 determines that the low power mode is enabled, the method 300 proceeds to block 410 where the shutdown control logic 280 commands the memory device 220 to open the switch 240 following a successful shutdown of the IHS 100. In other words, the auxiliary power rail is disconnected from the system silicon 210.

It is to be understood that one or more of these steps may be omitted and that other steps may be included in embodiments of the present disclosure. In an embodiment, a workstation IHS's power consumption of a motherboard in a low power mode may be ~400 mW without the systems of the present disclosure. However a comparable workstation IHS's power consumption of a motherboard in a low power mode may be ~5 mW using the systems of the present disclosure. Thus, in an embodiment, power consumption in the low power mode may be reduced by a factor of 80.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power supply system comprising:
a power supply coupled to a load by each of a main power rail and an auxiliary power rail;
a switch coupled to the auxiliary power rail between the power supply and the load; and
a controller coupled to the switch;
wherein the controller is operable, in response to receiving a shut down command and determining that a low power mode is enabled, to determine that the load has been successfully shut down and the main power rail has been turned off and, in response, activate the switch to prevent power from being supplied by the power supply to the load over the auxiliary power rail; and
wherein the controller is operable, in response to receiving a power-on signal and with the low power mode enabled, to activate the switch to allow power to be supplied by the power supply to the load over the auxiliary power rail.

2. The power supply system of claim 1, wherein the switch includes a transistor switch.

3. The power supply system of claim 1, wherein the low power mode is enabled and disabled by a user.

4. The power supply system of claim 1, wherein the low power mode is enabled and disabled using one of a basic input/output system (BIOS) setup, an operating system setting, a jumper, and an external command.

5. The power supply system of claim 1, wherein the controller receives a power state signal from the load.

6. The power supply system of claim 1, wherein the controller includes a memory device.

7. The power supply system of claim 6, wherein the memory device includes a flip-flop device.

8. An information handling system (IHS) comprising:
a plurality of IHS components including a processor;
a power supply coupled to the plurality of IHS components by each of a main power rail and an auxiliary power rail;
a switch coupled to the auxiliary power rail between the power supply and the plurality of IHS components; and
a controller coupled to the switch;
wherein the controller is operable, in response to receiving a shut down command and determining that a low power mode is enabled, to determine that the IHS has been successfully shut down and the main power rail has been turned off and, in response, activate the switch to prevent power from being supplied by the power supply to the plurality of IHS components over the auxiliary power rail; and
wherein the controller is operable, in response to receiving a power-on signal and with the low power mode enabled, to activate the switch to allow power to be supplied by the power supply to the plurality of IHS components over the auxiliary power rail.

9. The IHS of claim 8, wherein the switch includes a transistor switch.

10. The IHS of claim 8, wherein the low power mode is enabled and disabled by a user.

11. The IHS of claim 8, wherein the low power mode is enabled and disabled using one of a basic input/output system (BIOS) setup, an operating system setting, a jumper, and an external command.

12. The IHS of claim 8, wherein the controller receives a power state signal from the load.

13. The IHS of claim 8, wherein the controller includes a memory device.

14. The IHS of claim 13, wherein the memory device includes a flip-flop device.

15. A method comprising:
providing a power supply coupled to a load by each of a main power rail and an auxiliary power rail, a switch coupled to the auxiliary power rail between the power supply and the load, and controller coupled to the switch;
receiving, by the controller, a shut down command;
determining, by the controller in response to receiving the shut down command, that a low power mode is enabled;

determining, by the controller in response to determining that the low power mode is enabled, that the load has been successfully shut down and the main power rail has been turned off;

activating, by the controller in response to determining that the load has been successfully shut down and the main power rail has been turned on, the switch to prevent power from being supplied by the power supply to the load over the auxiliary power rail;

receiving, by the controller, a power-on signal; and activating, by the controller in response to receiving the power-on signal and with the low power mode enabled, the switch to allow power to be supplied by the power supply to the load over the auxiliary power rail.

16. The method of claim 15, wherein the switch includes a transistor switch.

17. The method of claim 15, wherein the low power mode is enabled and disabled by a user.

18. The method of claim 15, including enabling and disabling the low power mode using one of a basic input/output system (BIOS) setup, an operating system setting, a jumper, and an external command.

19. The method of claim 15, including receiving by the controller a power state signal from the load.

20. The method of claim 15, wherein the controller includes a flip-flop type memory device.

* * * * *